Patented Mar. 8, 1927.

1,620,458

UNITED STATES PATENT OFFICE.

HENRI C. J. H. GELISSEN, OF RIJSWIJK, NETHERLANDS, ASSIGNOR, BY MESNE ASSIGNMENTS, TO NOVADEL PROCESS CORPORATION, OF BUFFALO, NEW YORK, A CORPORATION OF NEW YORK.

PROCESS OF IMPROVING MILLING PRODUCTS.

No Drawing. Application filed May 3, 1926, Serial No. 106,534, and in the Netherlands March 11, 1925.

The present invention relates to improving the qualities of flour, meal and milling products of a similar character, particularly those which are used in panification, and will be described herein in connection with flour made from wheat or other cereal grains. It will be understood however that the invention is not restricted to the treatment of flour and meal from cereal grains since it is also applicable to other kinds of edible flour etc., made from various other kinds of vegetable matter. The invention is based upon the discovery that it is possible to produce in the mass of flour itself the agents necessary for acting upon the flour, or for destroying the coloring matters of the flour, for improving some one or more of the properties of the flour.

Heretofore it has been the usual practice to add a ready formed substance, such as organic or inorganic peroxids, to flour to be treated, see for example U. S. Patent to Sutherland No. 1,380,334. Such procedure is open to the objection that some of these peroxids (certain of the organic peroxids in particular) are relatively unstable bodies, so that they may suffer a good deal of deterioration if kept for a long period before use upon the flour to be treated. A further objection to the use of ready formed peroxids is that the peroxids are in many cases rather difficult to uniformly mix with the flour, in the minute proportions necessary for improving the flour. Thus it will be understood that the operation of completely mixing a mass of flour with a few hundredths of a percent of an organic peroxid, in such a way as to produce a completely uniform mixture is rather difficult, and as a result the mixing is often not as complete as might be desired, requiring thereby more of the peroxid than is really necessary for the treatment of a given batch of flour.

This is in spite of the fact that efforts have been made to add the flour-improving material in a relatively fine condition to the flour, and by using specially designed mixing machines, in order to give as complete a mixture as possible of the flour with the minute quantities of peroxids.

The process of the present invention starts from quite a different angle, and consists in forming the flour-improving peroxid compounds in the flour to be treated, instead of adding the ready formed peroxid. It is believed that this is a new principle in flour-improving processes. With certain organic materials it is readily possible to easily and thoroughly incorporate the flour with a very small amount of a substance, and subsequently to deliver eventually into the mass, oxygen gas (or a gas containing a relatively large amount of free oxygen, or in some cases air can be used), for oxidizing the said added substances to peroxid compounds capable of effecting the bleaching and improving the flour.

Along with the substances added to the flour may be included catalyzers. Mild alkalies may also be added, catalyzers being applied or not, but the alkalies must be added after the end of the bleaching process. The object of adding mild alkalies is to quickly neutralize any acids which may be formed in the mass of flour, either as direct products of the oxidation, or as by-products thereof. It will be understood that the catalyzers can be added either simultaneously with or before or after the addition of the substance to be oxidized.

The preferred substances to be added to the flour, and which are to be subsequently oxidized, are in many cases liquids, and these may be used as such, or after suitable dilution with an inert diluent liquid solvent. Solid substances capable of oxidation to peroxids can also be added to the flour, these being added preferably in the form of solutions or suspensions or emulsions, and liquids which are to be added to the flour can likewise be added in the form of suspensions or emulsions. In some modifications of the process, solutions or suspensions or emulsions of materials (or the materials themselves) can be added direct to the flour, to react with each other directly for the production of the peroxid compounds, which action can be accelerated by the employment of suitable catalyst. Such substances can be added either all at once or in any desired order, and preferably the substances to be added to the flour are added in a liquid state, for example as solutions or fine suspensions, in a finely atomized condition. In some cases it is also possible to add the said materials to the flour in the form of vapors, say at 25° C. or even at atmospheric temperature. Atomization can be effected either by means of air or in some cases preferably by means of inert gases such as nitrogen or purified chimney gases or carbon dioxid, depending on the particular substances to be added. The flour and the atomized or vaporized materials may, particularly when operating in chutes, towers and the like, be passed in a direction opposite to the flow of said vapors or atomized liquids. The action of the added substances or the peroxids produced therefrom may be intensified by subjecting to actinic light such as ultra-violet light, as well as by agitation, use of proper temperatures, presence of activating gases, etc.

In the present invention the best results can usually be obtained if one or more anhydrides and one or more aldehydes are added to the flour to be treated, this addition being preferably accompanied by a simultaneous (or successive) addition of catalyzers or mild alkalies or both. The flour can be, during the addition of the said substances, spread out in the form of thin layers, or it may be tumbled in a tumbling barrel or equivalent device or otherwise well agitated, during such addition in order to expose fresh surfaces to the substances added. In some cases the said substances can be added while the flour is flowing downwardly through a suitable chute, or while it is being sifted downwardly through a suitable chute or equivalent device. These modes of handling the flour are also suitable when treating the same with vapors of the substances from which it is desired to form peroxid compounds, which vapors can also be diluted with inert gases or vapors or used without such dilution.

The most suitable catalyzers to be added will depend upon the particular substances to be oxidized, compounds of chromium, cobalt, iron, uranium, vanadium, such as chromium sulfate, cobalt acetate, cobalt nitrate vanadium sulfate and the like can be employed, these being either first mixed with the flour, or mixed with the flour simultaneously with the mixing of the substance to be oxidized, or mixed with the flour after the substance to be oxidized. In some cases it is possible to dissolve or to suspend the very finely divided catalytic material in the liquid organic substance to be oxidized, and to then atomize the mixture upon the flour (diluted or not as desired) under conditions above specified.

The flour of course will absorb a small amount of liquid without becoming appreciably moist or without being converted into the condition of a dough.

In accordance with the present invention, it is advisable to employ substances which do not leave, upon oxidation to peroxids, and upon subsequent decomposition of the peroxids and improvement thereby of the flour, objectionable odors in the flour. It will also be obvious that the materials to be used should not be poisonous or injurious to the human digestive system, and in this connection I call attention to the fact that some of my co-workers have heretofore proposed the addition of benzaldehyde to flour, which substance alone would leave an objectionable odor in the flour, which would have to be removed. Benzaldehyde can however be employed in the present case, when used in conjunction with anhydrides.

As an illustration of the theory of the present invention, a mixture of equimolecular parts of acetic anhydrid and benzaldehyde can be mixed with sand, or other inert matter, this operation being conducted for example at twenty degrees C. At the temperature stated, a current of dry oxygen is passed over or through the mass of sand containing the above substances, which thereby become converted into benzoyl-acetyl-peroxid, which at the temperature of the operation is capable of exercising a bleaching effect upon the flour.

The bleaching effect which is readily obtained in accordance with the present invention, is probably to be ascribed to the activity of the peroxids as bleaching agents, by destroying the organic coloring matters in the flour or equivalent material. The carotin perhaps reacts with the peroxid thus formed in dissolving one of the double linkings by forming a product of the formula: $C_{40}H_{56}(OCOR)_2$ which is white in color. (R is alkyl, aryl or aralkyl).

The mechanism of the bleaching operation in the present case is probably the same as in the prior cases where peroxid compounds were added direct, in a preformed condition, to the flour, but it is found that in accordance with the present invention the bleaching effect and the flour-improving effect are considerably enhanced, probably in part due to a better mixing of the peroxid with the flour. A further improvement consists in that the range of peroxid substances is broader than in the prior art, for the reason that certain peroxids are too unstable for application as such to the flour to be treated. The amount of chemicals to form peroxids in accordance with the present case can vary a good deal, depending upon the specific substances to be used, and the degree of bleaching and other improvement which it is desired to secure in the flour.

It is rather surprising that in the present invention, the organic substances added to the flour will readily take up oxygen to form peroxids, and react with the flour or to constitutents thereof to be bleached, and that these organic peroxids are not decomposed in advance by any moisture which may be present or by the action of peroxidases and the like. It appears also suprising that these peroxid compounds will form themselves and readily react upon carotin and similar substances contained in the flour to bleach the same. The process is all the more suprising in view of the fact that in the manufacture of many of the peroxid compounds including the group of diacyl peroxid compounds, such for example as the oxidation of a mixture of acetic anhydrid and acetaldehyde, it has heretofore been pointed out in the literature, that any considerable amounts of impurities if present will completely or substantially prevent the formation of such peroxids.

Using the said aldehydic and anhydride materials, it appears probable that the following reactions take place.

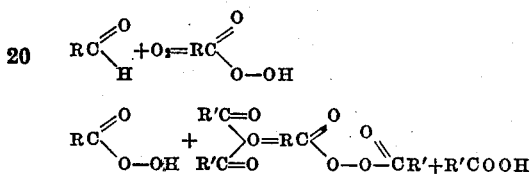

In the above reactions, R and R' are organic radicals, such as alkyl, aralkyl or aryl radicals.

The following examples are given for the purpose of more completely explaining the invention, but it is to be understood that these are given merely by way of illustration, and not as limiting the scope of the invention hereto.

Example 1.

To 100 kilos of wheat flour of relatively low quality and rather dark in color, there are successively added, by atomization with an inert gas, 2.5 grams of benzaldehyde and 2.5 grams of acetic anhydrid, after which a current of ordinarily dry air is blown through the mass, or through a receptacle in which the mass is agitated or tumbled, for some time say 2 hours at 20° C.

Example 2.

100 kilos of wheat flour are successively treated with 2.5 grams of acetaldehyde and 2.5 of acetic anhydrid, these being atomized upon the flour, in the form of a very fine mist, the flour being agitated during such operation, in a tumbling barrel. After the said quantities of substances have been added, a current of air is passed through the said receptacle, containing the flour and added substances, the air being at about atmospheric temperature, and being blown through the mass continuously as long as test samples show that the bleaching operation is continuing. This may require about 2 hours.

Example 3.

100 kilos of wheat flour are, while passing downwardly through a tower, treated successively with 2.5 grams of butyl aldehyde and 2.5 grams of succinic acid anhydrid. Thereafter the entire mass is treated with a slow current of air at about room temperature, for about 2 hours.

In the above mentioned examples the substances employed may also be added in an opposite succession or together.

In the following examples respectively the use of a catalyzer and the addition of an alkali is given, but it is to be understood that these are also given merely by way of illustration and not as limiting the scope of the invention hereto.

Example 4.

To 100 kilos of wheat flour is added a mixture of 2.5 grams of cinnamoyl aldehyde, 3 grams of butyric acid and 0.01 gram of cobalt acetate, after which a current of ordinary dry air is blown through the mass, or through a receptacle in which the mass is agitated or tumbled for some time say ½ hour at room temperature.

Example 5.

100 kilos of wheat flour are treated with a mixture of 2 grams of acetic anhydrid and 2 grams of benzaldehyde, after which a current of air is passed through the mass during some time say ½ hour.

Among other materials which can be successfully employed, there may be mentioned anhydrids such as acetic acid anhydrid, propionic acid anhydrid, butyric acid anhydrid, valeric acid anhydrid, heptyl acid anhydrid, nonyl acid anhydrid, succinic acid anhydrid, phthalic acid anhydrid, which are in accordance with the present invention to be used together with an aldehyde or with hydrogen peroxid.

These materials can be successively atomized into the mass of flour under agitation. It is also possible to employ peracids, (organic or inorganic) together with organic anhydrides, (mono- or more-basic), for example peracetic acid and propionic aldehyde.

In these two latter cases it is not necessary to blow air through the mass of flour and added substances, because the peracids themselves react with the anhydrid forming a diacyl-peroxid.

The following two examples are illustrative of this feature:

Example 6.

100 kilos of wheat flour are treated with 3 grams of propionic acid anhydrid. After this quantity has been added a solution of 2 grams of peracetic acid in 50 cc. of water is added to the flour. Thereafter the flour is agitated for some time say ½ hour in a tumbling barrel.

Example 7.

100 kilos of wheat flour are treated with a mixture of 2 grams butyric acid anhydrid and 5.6 grams of hydrogen peroxid, the latter having a strength of 10%. Thereafter the entire mass is agitated for some time say ½ hour in a tumbling barrel.

I claim:

1. A method of improving a quality of a milling product of the character used in panification which comprises the step of forming in such milling product, a peroxid compound capable of improving a quality of said milling product.

2. A method of improving a quality of a milling product of the character used in panification which comprises the steps of forming in such milling product, a peroxid compound capable of improving a quality of said milling product, and causing such peroxid compound to act upon said milling product to improve the same.

3. A method of improving a property of a milling product of the character used in panification which comprises the steps of permeating such milling product with a small amount of chemicals capable of being changed into a peroxid compound without injury to said milling product, and thereafter oxidizing such chemicals while associated with such milling product, to form the said peroxid compound in situ in the said milling product.

4. A method of improving a property of a milling product of the character used in panification which comprises the steps of permeating such milling product with a small amount of liquid chemicals capable of being changed into a peroxid compound without injury to said milling product, and thereafter oxidizing such chemicals while associated with such milling product, to form the said peroxid compound in situ in the said milling product.

5. A method of improving a property of a milling product of the character used in panification which comprises the steps of permeating such milling product with a small amount of organic chemicals capable of being changed into a peroxid compound without injury to said milling product, and thereafter oxidizing such chemicals while associated with such milling product, to form the said peroxid compound in situ in the said milling product.

6. A method of improving a property of a milling product of the character used in panification which comprises the steps of permeating such milling product with a small amount of liquid oxygen-containing organic substances which are capable of being changed into a peroxid compound without injury to said milling product, and thereafter oxidizing such chemicals while associated with such milling product, to form the said peroxid compound in situ in the said milling product.

7. A method of improving a property of a milling product of the character used in panification which comprises the steps of permeating such milling product with a small amount of chemicals capable of being changed into a peroxid compound without injury to said milling product, and a chemical adapted to neutralize objectionable substances likely to be formed with such peroxid, and thereafter oxidizing such chemicals while associated with such milling product, to form the said peroxid compound in situ in the said milling product.

8. A method of improving a property of a milling product of the character used in panification which comprises the steps of permeating such milling product with a small amount of chemicals capable of being changed into a peroxid compound without injury to said milling product, and a mild alkali adapted to neutralize acids formed in said milling product, and thereafter oxidizing such chemicals while associated with such milling product, to form the said peroxid compound in situ in the said milling product.

9. A method of improving a property of a milling product of the character used in panification which comprises the steps of permeating such milling product with a small amount of chemicals capable of being changed into a peroxid compound without injury to said milling product, and a catalyst capable of assisting in such reaction, and thereafter oxidizing such chemicals while associated with such milling product to form the said peroxid compound in situ in the said milling product.

10. A method of improving a property of a milling product of the character used in panification which comprises the steps of permeating such milling product with a small amount of chemicals capable of being changed into a peroxid compound without injury to said milling product, and thereafter oxidizing such chemicals by action of oxygen-containing gases while associated with such milling product, to form the said peroxid compound in situ in the said milling product.

In testimony whereof I affix my signature.

HENRI C. J. H. GELISSEN.